Figure 1:
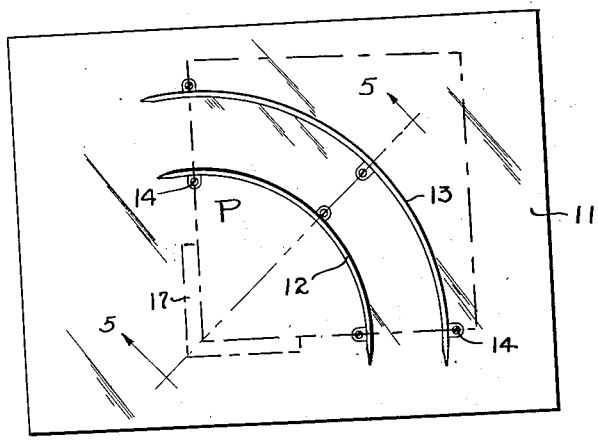

Nov. 16, 1926.  1,606,865
A. H. BATES ET AL
METHOD OF MAKING ANNULAR RUBBER TUBES
Filed April 2, 1925   3 Sheets-Sheet 1

Nov. 16, 1926.

A. H. BATES ET AL 1,606,865

METHOD OF MAKING ANNULAR RUBBER TUBES

Filed April 2, 1925   3 Sheets-Sheet 2

Inventor
Albert H. Bates
George M. Doule
By Baker, Moehlin, Goedrick, Stearn
Attorneys Nov. 16, 1926.

A. H. BATES ET AL 1,606,865

METHOD OF MAKING ANNULAR RUBBER TUBES

Filed April 2, 1925      3 Sheets-Sheet 3

Patented Nov. 16, 1926.

1,606,865

UNITED STATES PATENT OFFICE.

ALBERT H. BATES, OF SHAKER HEIGHTS, AND GEORGE M. SOULE, OF SOUTH EUCLID, OHIO, ASSIGNORS TO PARAMOUNT RUBBER CONSOLIDATED, INC., OF TUCKAHOE, NEW YORK, A CORPORATION OF DELAWARE.

METHOD OF MAKING ANNULAR RUBBER TUBES.

Application filed April 2, 1925. Serial No. 20,062.

This invention relates to the manufacture of annular rubber tubes, as for example, inner tubes for automobile tires, life preservers, etc. The object is to provide for such manufacture rapidly and economically from rubber sheets which are cut out and joined by peripheral seams.

In accomplishing the desired result of rapidly and economically cutting out of the parts and joining them by machinery, we avail ourselves of an invention of Fred T. Roberts, described and claimed in his application No. 712,505, filed May 12, 1924. That application sets forth an operation involving the superimposing of two sheets of rubber and the insertion between them, for a portion of their area, of a doubled sheet with its opening between its leaves facing outwardly and cutting through such pile of sheets with an outline die which is formed to join each outer sheet to one layer of the doubled sheet where the doubled sheet is present and in another region join the two outer sheets directly together. In such operation raw rubber stock is employed which is treated so that it will not adhere except under pressure.

We have discovered that the Roberts process mentioned may be adapted for the efficient forming in a comparatively small press of annular tubes which when vulcanized are suitable for automobile tire tubes and similar uses. We have illustrated our process in the drawings herewith, which we will now describe.

Figure 2:
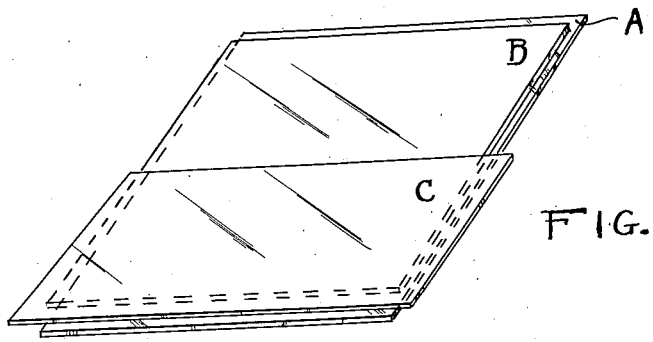
Figure 3:
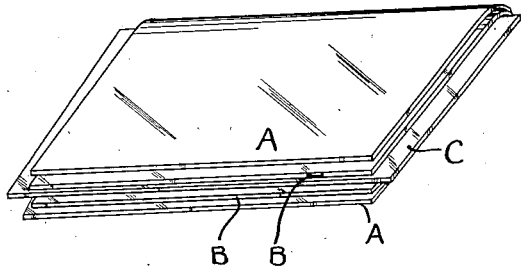
Figure 4:
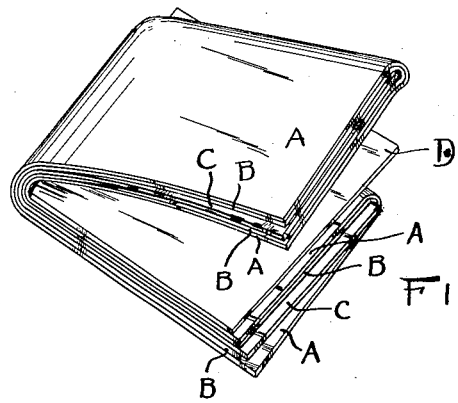
Figure 5:
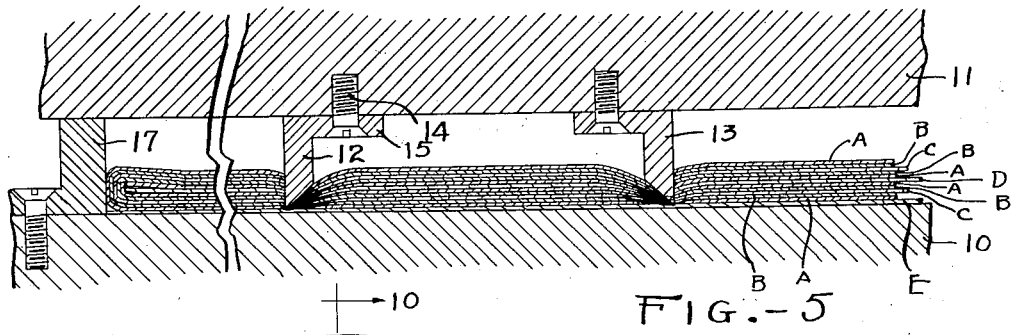
Figure 11:
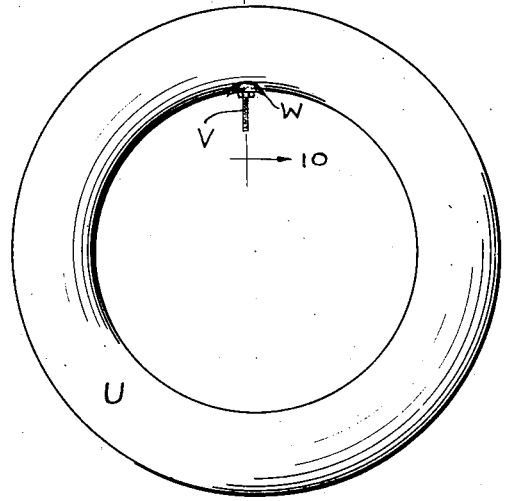
Figure 6:
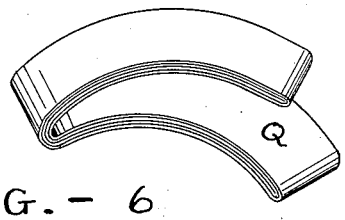
Figure 8:
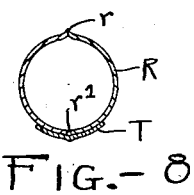
Figure 7:
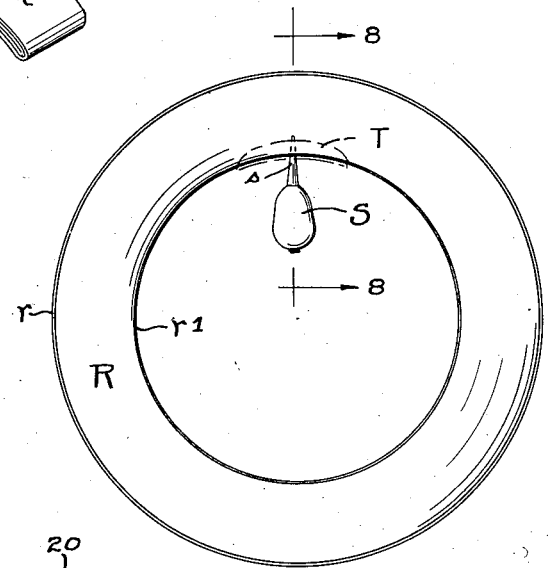
Figure 9:
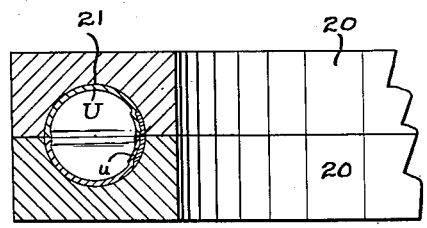
Figure 10:
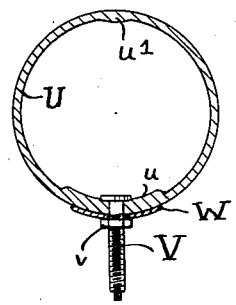

Fig. 1 is a bottom plan of a cutting and seaming die used in carrying out our process, the pile of the rubber sheets and a guard for positioning them beneath the die being indicated by broken lines; Fig. 2 is a perspective of two rubber sheets and a paper separator surmounted in the first step of our forming process; Fig. 3 is a perspective of the same material with the extended portion of the two rubber sheets folded on top of the paper separator, illustrating the second step of the forming process; Fig. 4 is a perspective of the same sheet when the pile in Fig. 3 has been folded on itself embracing a second intermediate paper separator, illustrating the third step of the forming process; Fig. 5 is a vertical cross-section through a forming press illustrating the action of the die on the pile of sheets shown in Fig. 4, such action constituting the fourth step of the forming process; Fig. 6 is a perspective of the cut-out inner annular tube resulting from the pile of material of Fig. 4; Fig. 7 is a view of the annular inner tube biscuit when unfolded, and showing the position of a syringe bulb for injecting fluid into the tube to provide for the vulcanizing expansion. Such action may constitute the fifth step of the process; Fig. 8 is a cross-section, as indicated by the line 8—8 on Fig. 7, showing the application of an external patch the position of which is indicated by broken lines in Fig. 7; Fig. 9 is a cross-section through a curing mould with the annular tube in place therein showing the seating of the external patch flush with the wall of the tube; Fig. 10 is a cross-section through a complete inner tire tube made by this invention as indicated by the line 10—10 on Fig. 11; Fig. 11 is a side elevation of the completed tire tube.

In carrying out our process, we take two sheets of rubber larger in each face-dimension than the exterior diameter of the finished tube. Such sheets may conveniently be square and in making an inner tube for automobile tires might be approximately a yard square. Each sheet is of raw rubber with its surface treated with starch or soap stone just sufficiently so that it will not adhere to other raw rubber when simply in contact therewith, but may be caused to firmly adhere by mechanical pressure. The two sheets of raw rubber are indicated at A and B in Fig. 2. These are placed on top of each other and a sheet of paper C of about one-half the area is placed over one-half of the surmounting rubber sheets.

The next step in the process consists in folding over the extended portions of the two sheets A and B on top of the paper separator so that one sheet becomes nested within the other with their doubled edges adjacent. We now place on top of the pile shown in Fig. 3 a paper separator D having an area of about one-half that of a rubber leaf exposed in Fig. 3, the edge of such separator coming to the middle of the pile, and then fold over the projecting portion of the pile on top of the separator, as indicated on Fig. 4.

We now place the folded pile of rubber sheets and paper separators on a paper pad E lying on top of the flat lower platen 10 of a hydraulic press. The upper platen of this press is indicated at 11. To its face are secured a pair of concentric arcuate ribs 12 and 13. These ribs are shown as held in place by screws 14 passing through ears 15 on the ribs. The lower face of these ribs come to the same plane at their outer edges but incline inwardly toward the platen carrying the ribs as indicated in Fig. 5, though the angle of the bevel is exaggerated in this view for purposes of clearness.

In placing the doubled sheets beneath the two arcuate ribs, a pile is so placed that its corner is at the center of curvature of the two arcs and the nested doubled edges at right angles to each other extend radially across the arcuate ribs. We prefer to mount on the lower platen a right-angle bracket 17 as a guide for positioning the rubber sheets, the position of such rubber sheets being indicated at P in Fig. 1.

When the sheets are positioned on the lower platen, the platens are caused to approach each other with hydraulic pressure until the sharp outer edge of the ribs has cut entirely through the various layers of the pile and into the paper pad E. The guide 17 if desired may form a suitable gauge block limiting the approach of the platens so that the bevel edges of the ribs just cut into the paper pad E as illustrated in Fig. 5. While the extreme outer edge of the ribs cuts through the various layers of the pile, the inwardly beveled faces of these ribs press the successive rubber sheets firmly into engagement with each other to join them in pairs. The paper separators, however, prevents the joining of one pair to an adjacent pair.

We now open the press and remove the cut-off excess on the concave side of the shorter arc and on the convex side of the longer arc, and we have the biscuit substantially as illustrated at Q in Fig. 6, although this view omits the middle separator. We now unfold the biscuit, removing the other separators and we have the annular tube illustrated at R in Fig. 7, composed of two sheets joined by peripheral seams $r$ and $r^1$ respectively.

Before the tube is vulcanized, provision is made for creating a gas within the tube to force it outwardly against the walls of the curing mould. Heat gasifying powder might be placed in proper position in the folded pile of sheets so as to come within the cut-out portion. We prefer however to let the heat gasifying substance wait until the formation of the annular biscuit and then inject it in liquid form. Such gasifying substance may then be simply water injected into the tube and becoming steam from the heat of vulcanization. Fig. 7 indicates at S a suitable syringe with a sharp discharge nozzle $s$ which is projected through the inner periphery of the tube and the desired quantity of liquid discharged into the biscuit, after which the small hole occupied by the nozzle is suitably sealed and the tube vulcanized.

If the tube is to constitute an inner tube for an automobile tire, we prefer to place over the opening made by the syringe nozzle, a suitable reinforcing patch T, which is cemented in raw rubber form to the exterior of the tube at its inner periphery. We now place the reinforced tube in an annular cavity of a vulcanizing mould composed of a pair of rings 20, each having an annular groove semi-circular in cross-section as indicated at 21. The wall of this groove is smooth where it extends across the external patch T. Now, when the curing mould is heated, the material in the tube gasifies forming a fluid pressure which seats the rubber firmly against the wall of the mould with the result that the patch is embedded in the tube with its exterior flush therewith, the tube wall bending inwardly behind the patch, as shown at $u$ in Fig. 9.

It may be noted that the method of applying the patch to the exterior of the tube and having the internal reinforce formed by deflecting the wall of the tube inwardly is covered in Patent No. 1,503,667 granted August 5, 1924 to Wm. E. Roberts, while an annular tube having such reinforcement is claimed in another patent of William E. Roberts, namely No. 1,455,734 granted May 15, 1923.

Following the curing operation, the tube is removed from the curing mould and an opening is made through the reinforced portion of the inner periphery for the tire nipple. This opening is preferably located adjacent the center of the reinforce and thus surrounds and obliterates the small opening made by the insertion of the syringe nozzle. A nipple is now passed through the opening produced, the head of the nipple lying on the inner face of the patch and a nut is screwed down on the exterior in the usual manner. Figs. 10 and 11 illustrate at U the complete inner tube produced. The nipple is designated V, its shank extending through the reinforced portion $u$ of the tube. The nut $v$ on the nipple shank presses the usual metal shoe W against the exterior.

It will be seen from inspection of Fig. 10 that within the outer periphery of the tube is a small inwardly thickened annular portion $U^1$. This comes from the excess of rubber provided at the periphery by the outer periphery seam $r$, the material being forced inwardly by the smooth circular form of the cavity in the curing mould. A corresponding inward portion is formed at the inner periphery. These thickenings serve to strengthen the peripheral seams.

Our method is simple and may be carried out with a great rapidity. The delay in handling large extended sheets in a press is avoided and a much less expansion press may be used. The resulting product has a great advantage over ordinary tire tubes in that there are no unvulcanized splices or seams to separate as the tube becomes heated in use.

While we have illustrated the method as carried out by making a second double of the pile of sheets and cutting through the pile with substantially quadrant ribs, the operation could be performed with one double by making the ribs semi-circular, but that would require a larger press. On the other hand it might be feasible to further reduce the size of the press by giving a third double to the folded pile of sheets. In either case however, when making circularly annular inner tubes, the lines of fold are radial of the cutting ribs, so that a biscuit is produced which may be unfolded into the desired annular form.

Having thus described our invention, we claim:

1. The method of making hollow articles of plastic material comprising placing a pair of doubled sheets one within the other with their lines of fold adjacent, while preventing mutual adherence of the two leaves of the inner sheet but allowing adherence of the outer face of each of such leaves with the inner face of the adjacent leaf of the outer sheet, and then simultaneously joining said faces together by superimposed marginal seams.

2. The method of making hollow articles of plastic material comprising nesting a pair of doubled sheets one within the other, while preventing mutual adherence of the two leaves of the inner sheet, but allowing adherence of the outer face of each of such leaves with the inner face of the adjacent leaf of the outer sheet, then cutting through such surmounting leaves and pressing the sheets together adjacent the line of cut and on the inner side thereof, the common double of the pairs of sheets extending crosswise of the line of cut.

3. The method of making annular tubes comprising doubling a pair of sheets of rubber across a separator, the fold of one sheet nesting within the fold of the other, cutting through such folded sheets in two arcs with the doubles of the sheets extending across the arcs in two regions, joining the sheets where cut through by marginal seams, unfolding the biscuit and vulcanizing it.

4. The method of making annular tubes comprising nesting a pair of doubled sheets one within the other, with means for preventing mutual adherence of the two leaves of the inner sheet, while allowing adherence of the outer face of each of such leaves with the inner face of the adjacent leaf of the outer sheet, then cutting through such surmounting leaves by a pair of arcuate cutting edges which are formed to press the sheets together adjacent the line of cut and on the inner side thereof, the common double of the pairs of sheets extending crosswise of the arcuate cutting edges.

5. The method of making annular tubes comprising nesting a pair of doubled sheets, the inner sheet being prevented from having its layers mutually adhering, cutting through such folded sheets in two concentric arcs with the doubles of the sheets extending across the arcs in two regions, and joining the sheets where cut through by marginal seams.

6. The method of making annular tubes of plastic material comprising surmounting sheets of such material in folded form across a separator, cutting through such pile of sheets in two arcs to which the folded edge is radial, and at the same time joining the sheets together just inside the line of cut.

7. The method of making annular rubber tubes comprising doubling a pair of rubber sheets across a separator, cutting through such four leaves by a pair of concentric arcuate dies, the doubled edge of the sheets nesting together and extending across such arcuate dies, forming marginal seams between the adjacent sheets, unfolding the biscuit and curing it.

8. The method of making annular tubes comprising doubling a pair of rubber sheets across a separator, cutting through such four leaves by a pair of concentric arcuate dies with inwardly beveled edges, the doubled edge of the sheets extending across such arcuate dies, thereafter removing the biscuit, unfolding it and placing it in a curing mould having a pair of coacting annular cavities.

9. The method of making annular rubber tubes comprising surmounting sheets of raw rubber treated so that they will not normally adhere, doubling such sheets upon a separator, cutting through the doubled sheets and separator by a pair of concentric arcuate ribs having inwardly beveled faces, removing the biscuit formed, folding it out into a plane, and curing the article within a mould.

10. The method of making annular tubes comprising doubling a pair of sheets of rubber across a separator, the fold of one sheet nesting within the fold of the other, cutting through such folded sheets in two arcs with the doubles of the sheets extending across the arcs in two regions, joining the sheets where cut through by marginal seams, unfolding the biscuit, and injecting heat gasifying material thereinto, and vulcanizing the article in a mould.

11. The method of making annular rubber tubes comprising surmounting sheets of raw rubber, doubling such sheets upon a separator, cutting through the doubled sheets and separator by a pair of concentric arcuate ribs having inwardly beveled faces, removing the biscuit formed, folding it out into a plane, injecting heat gasifying material, and curing the article with internal pressure in an external mold.

12. The method of making annular tubes comprising placing a pair of doubled sheets one within the other, with means for preventing mutual adherence of the two leaves of the inner sheets, while allowing adherence of the outer face of each of such leaves with the inner face of the adjacent leaf of the outer sheet, then cutting through such surmounting leaves by a pair of concentric arcuate cutting edges which are formed to press the sheets together adjacent the lines of cut and on the inner side thereof, the common double of the pair of sheets extending crosswise of the arcuate cutting edges and radially thereof, the active arcs of the cutting edges forming a fraction of complete circumference, the numerator of which is unity, and the denominator of which is one-half the number of leaves cut through.

13. The method of making annular tubes comprising nesting a doubled sheet of plastic material within another sheet thereof, there being means for preventing mutual adherence of the leaves of the innermost sheet, then folding such pile at an angle to the first fold, there being means for preventing mutual adherence of layers of an outer leaf thus brought adjacent each other, cutting through such pile in two courses so placed with reference to each other that its lines of doubling extend crosswise of the cuts.

14. The method of making annular tubes comprising nesting a doubled sheet of rubber within another sheet of rubber, the innermost sheet having its leaves kept apart by a separator, then folding such pile at right angles to the first fold upon an additional separator, cutting through such pile by a pair of cutting edges, the pile being so placed with reference to the edges that its lines of doubling extends crosswise of the edges.

15. The method of making annular tubes comprising nesting a doubled sheet of raw rubber within another sheet of raw rubber, the innermost sheet having its leaves kept apart by a separator, then folding such pile at right angles to the first fold upon an additional separator, cutting through such pile by a pair of concentric arcuate cutting ribs with inwardly beveled seam-forming edges, the pile being so placed with reference to the ribs that its lines of doubling extend substantially radially from one cutting edge to the other.

16. The method of making annular tubes comprising nesting doubled sheets of rubber within each other, separating the adjacent leaves of the same sheet while leaving the adjacent face of different sheets in contact with each other, redoubling the pile one or more times, the lines of doubling of the resulting pile being radial, cutting through such pile by concentric cutting members which also form marginal seams between the adjacent leaves of different sheets without joining the adjacent leaves of the same sheet, unfolding the biscuit produced into substantially a single plane, and vulcanizing the biscuit by heat in an embracing vulcanizing mould and with internal fluid pressure.

17. The method of making inner tubes for automobile tires comprising nesting a pair of doubled sheets of rubber while preventing mutual adherence of the adjacent leaves of the inner sheet, cutting through the sheets with the doubled edge of the sheets lying crosswise of a pair of arcuate cutting dies, said dies having their edges shaped to cause marginal seams adjacent the cut-out portion, then unfolding the biscuit, applying a reinforcing patch along the inner periphery, curing the biscuit and patch in a surrounding mould, making an opening through the patch and applying an inflating nipple.

18. The method of making inner tubes for automobile tires comprising folding two surmounting sheets of rubber upon a separator, cutting through the sheets and separator with the doubled edge of the sheets lying radial to a pair of concentric arcuate cutting dies, said dies having their edges shaped to cause marginal seams adjacent the cut-out portion, then unfolding the biscuit, applying a reinforcing patch along the inner periphery, curing the biscuit and patch in a surrounding mould, making an opening through the patch for the insertion of an inflating nipple.

19. The method of making inner tubes for automobile tires comprising folding a pair of surmounting sheets of rubber upon a sheet separator, cutting through such leaves by a pair of concentric arcuate ribs having inwardly beveled faces whereby peripheral seams are formed and the surplus stock cut off, then unfolding the biscuit, inserting a nozzle through the inner periphery, injecting heat gasifying substance through the nozzle, applying a patch over the opening made by the nozzle, vulcanizing the patched tube in a mould, removing the cured article, and making an opening through the patch and inner wall behind it which includes the opening made by the nozzle, thus adapting the tube for insertion of an inflating nipple in the opening thus made.

20. The method of making annular inner tubes comprising nesting doubled sheets of rubber within each other, separating the adjacent leaves of the same sheet while leaving the adjacent face of different sheets in contact with each other, redoubling the pile one or more times, the lines of doubling of the resulting pile being radial, cutting through such pile by a pair of concentric arcuate ribs having inwardly beveled faces whereby peripheral seams are formed and the surplus stock cut off, then unfolding the biscuit, inserting a nozzle through the inner periphery, injecting heat gasifying substance through the nozzle, applying a patch over the opening made by the nozzle, vulcanizing the patched tube in a mould, removing the cured article, and making an opening through the patch and inner wall behind it which includes the opening made by the nozzle, thus adapting the tube for insertion of an inflating nipple in the opening thus made.

In testimony whereof, we hereunto affix our signatures.

ALBERT H. BATES.
GEORGE M. SOULE.